United States Patent
Zimmer et al.

(10) Patent No.: US 8,393,124 B2
(45) Date of Patent: Mar. 12, 2013

(54) ANCHOR FOR INSTALLATION IN LIGHTWEIGHT CONSTRUCTION PANELS AND METHOD FOR ITS INSTALLATION WITH CEMENT INJECTION

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 193 days.

(21) Appl. No.: 12/660,519

(22) Filed: Feb. 26, 2010

(65) Prior Publication Data

US 2010/0180535 A1    Jul. 22, 2010

Related U.S. Application Data

(63) Continuation-in-part of application No. PCT/DE2008/001254, filed on Jul. 29, 2008.

(51) Int. Cl.
    *F16B 13/04* (2006.01)
    *E04B 1/38* (2006.01)

(52) U.S. Cl. ........... 52/364; 52/351; 52/745.21; 411/43; 411/34

(58) Field of Classification Search .......... 52/351, 52/361, 362, 324, 364, 745.21, 745.13, 745.15, 52/363, 340, 368, 369, 367; 411/34, 43, 411/70
    See application file for complete search history.

(56) References Cited

U.S. PATENT DOCUMENTS

| | | | |
|---|---|---|---|
| 2,092,341 A | | 6/1936 | De Vries |
| 3,771,410 A | * | 11/1973 | Swindt, II ...................... 411/338 |
| 3,937,122 A | * | 2/1976 | Riedel ............................... 411/34 |
| 4,122,753 A | * | 10/1978 | Kuhlmann et al. ................ 411/2 |
| 4,269,106 A | * | 5/1981 | Leibhard et al. ................ 411/34 |
| 4,340,330 A | * | 7/1982 | Reidel ............................... 411/33 |
| 4,531,871 A | * | 7/1985 | Sigmund ........................ 411/361 |
| 4,690,597 A | * | 9/1987 | Liebig .............................. 411/32 |
| 4,806,053 A | * | 2/1989 | Herb ................................. 411/32 |
| 4,844,673 A | * | 7/1989 | Kendall ........................... 411/34 |
| 5,893,693 A | * | 4/1999 | Forest et al. .................... 411/30 |
| 6,077,009 A | * | 6/2000 | Hazelman ....................... 411/43 |
| 6,164,884 A | * | 12/2000 | Mayr ............................... 411/36 |
| 6,609,866 B2 | * | 8/2003 | Huang et al. .................... 411/34 |
| 6,679,662 B2 | * | 1/2004 | Nehl ............................. 411/80.5 |
| 6,898,918 B2 | * | 5/2005 | Eshraghi ..................... 52/787.1 |
| 7,517,182 B2 | * | 4/2009 | Cabrele ....................... 411/80.5 |

FOREIGN PATENT DOCUMENTS

| | | |
|---|---|---|
| CH | 604 024 | 8/1978 |
| DE | 3640929 A1 * | 6/1988 |
| DE | 42 26 552 | 2/1993 |
| DE | 20 2004 000 474 U1 | 5/2004 |
| DE | 20 2005 005 579 U1 | 9/2006 |
| GB | 1 273 604 | 5/1972 |
| GB | 2185081 A * | 7/1987 |
| JP | 01083907 A * | 3/1989 |

OTHER PUBLICATIONS

Brochure—fischer Leichtbauplattenbefestigen, "Das Neue Innovative Befestigungsystem in Papierwaben".

* cited by examiner

*Primary Examiner* — Phi Dieu Tran A
(74) *Attorney, Agent, or Firm* — Klaus J. Bach

(57) ABSTRACT

In an anchor installation in a lightweight construction panel having spaced cover plates with a support core disposed therebetween, wherein an anchor installed in a bore extending through at least one of the cover plates and the support core includes an expansion body having engagement elements spreading outwardly behind the cover plate to lock the anchor in the bore, the expansion body includes an axial bore fittingly accommodating a needle for the injection of cement into the expansion body and distribution passages for the distribution of the cement to various cavities in and around the expansion body for firmly fixing the anchor in the lightweight construction panel.

10 Claims, 6 Drawing Sheets

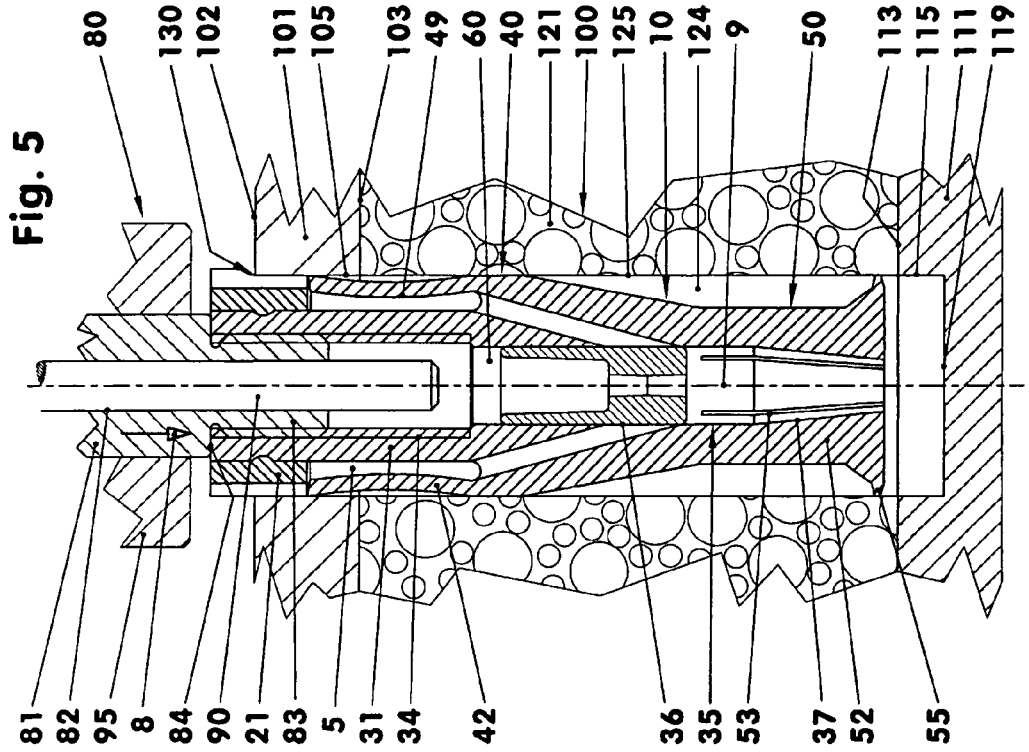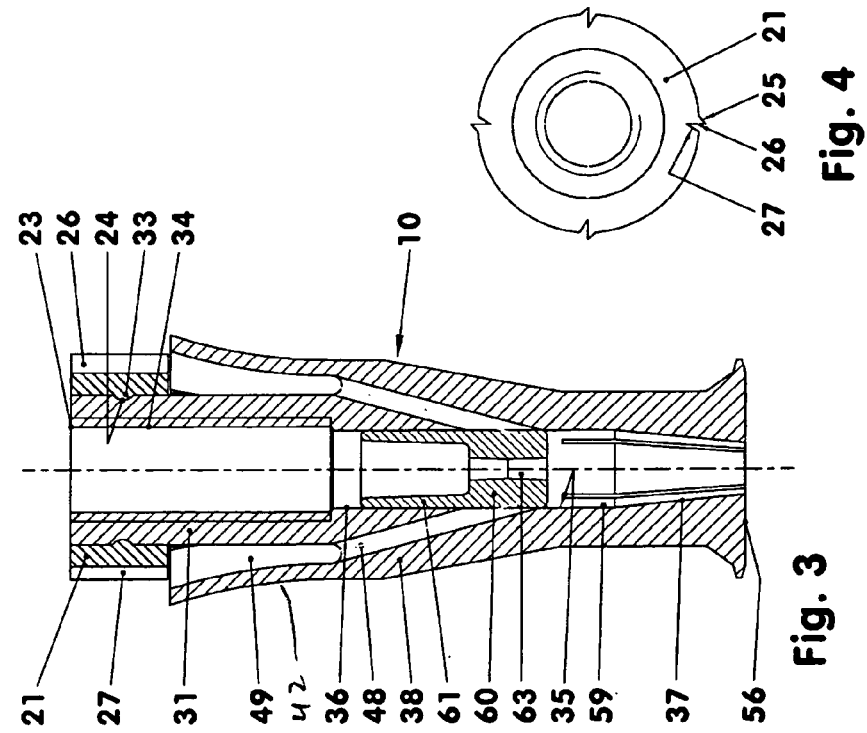

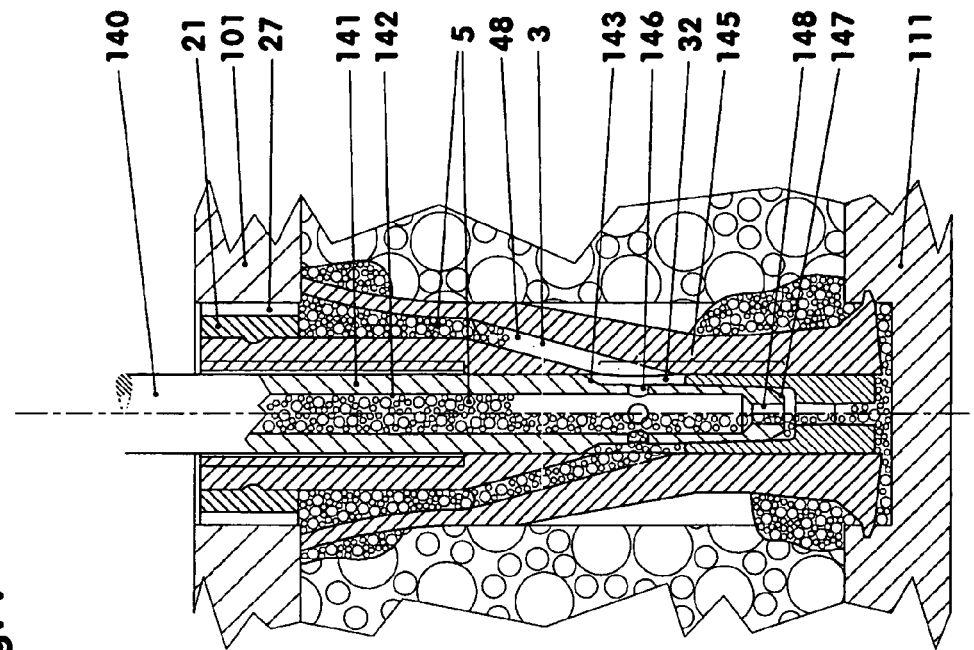
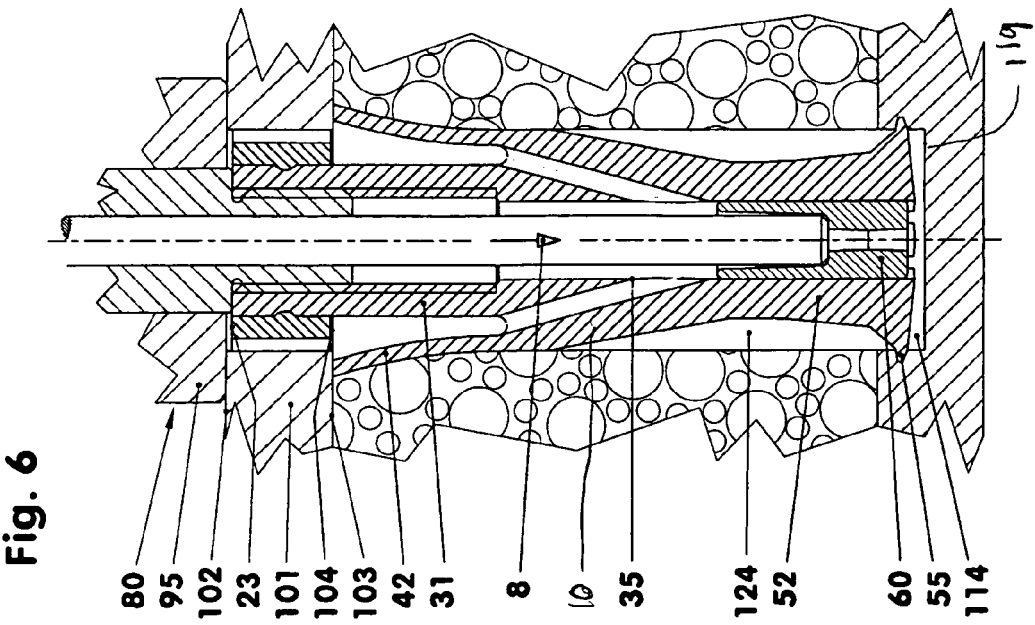

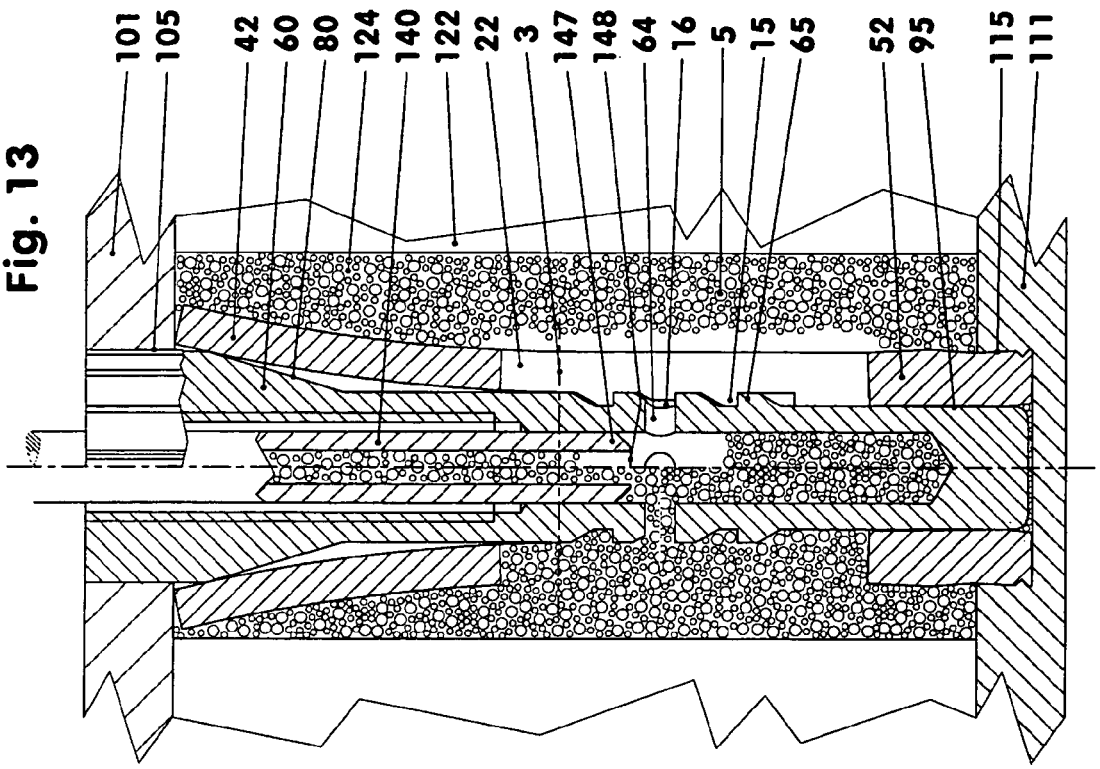
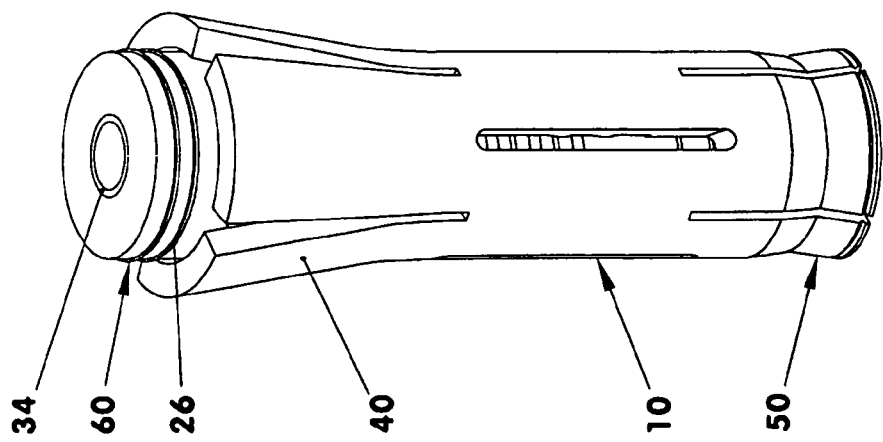

ANCHOR FOR INSTALLATION IN LIGHTWEIGHT CONSTRUCTION PANELS AND METHOD FOR ITS INSTALLATION WITH CEMENT INJECTION

This is a Continuation-In-Part Application of pending International patent application PCT/DE2008/001254 filed Jul. 29, 2008 and claiming the priority of German patent application 10 2007 041 058.3 filed Aug. 29, 2007.

BACKGROUND OF THE INVENTION

The invention resides in an anchor for installation in lightweight construction panels including a support core with a first and a second cover plate and an anchor installation method with cement injection for form- and material-locking mounting of the anchor, which includes an expansion body embedded with a cement material.

Lightweight construction panels with support cores disposed between cover plates are often also called sandwich plates, honeycomb plates or light-weight construction panels. All types of panels used in furniture construction generally include cover plates or veneer of thin wood shaving plates, medium- or high-density fiber plates, plywood or hard fiber plates. The sandwich panels include as intermediate layer or support core for example polymethane foam or polysterol. In the honeycomb panels, often corrugated web inserts or so-called expanded honeycomb layers are used as intermediate support layers. Most lightweight panels have a raw density which is below 500 kg/m$^3$. If for the intermediate layer no fire retardant aluminum foams or expanded glass is used, the raw density is below 350 kg/m$^3$. For comparison, it is noted that the raw density of an unveneered particle board is about 600-750 kg/m$^3$.

If hardware is to be attached to lightweight construction panels for example by screws, it is a problem that the mounting means generally find hold only on the relatively thin cover layers or cover plates. A typical solution herefor are straddling dowels as they are disclosed in the printed publication DE 20 2004 000 474 U1. The straddling dowels however have the disadvantage that they engage the upper cover plate in front and back over a large area. The rear engagement displaces furthermore the support core material over a large area around the bore whereby the cover plate is easily released from the support core material when a pulling force is effective on the straddling dowel.

Furthermore, from the brochure "Fischer Leichtbauplattenbefestiger" of the company Fischer Befestigungssysteme GmbH, a cement anchor is known since May 2007. The cement anchor is a tubular body which is provided at its upper end with a plurality of transverse bores which end in a kind of thread grooves. At its lower end, the body is open. The lower edge includes semi-circular channels. For mounting, the anchor is inserted into a bore in the lightweight construction panel—without mechanical fixing. Into the central bore of the tubular body, a cement material is pressed which exits the tubular body in the area of the cover plates. In the process, the cement material also fills the central bore of the anchor. The mounting element, for example a screw, is then screwed into the cement material in the central bore.

It is the object of the present invention to provide an anchor for lightweight construction panels, which can be easily installed into the lightweight construction panel and which is firmly and durably retained therein.

SUMMARY OF THE INVENTION

In an anchor installation in a lightweight construction panel having spaced cover plates with a support core disposed therebetween, wherein an anchor installed in a bore extending through at least one of the cover plates and the support core includes an expansion body having engagement elements spreading outwardly behind the cover plate to lock the anchor in the bore, the expansion body includes an axial bore fittingly accommodating a needle for the injection of cement into the expansion body and distribution passages for the distribution of the cement to various cavities in and around the expansion body for firmly fixing the anchor in the lightweight construction panel.

In this way, such an anchor is inserted into a corresponding bore in the lightweight construction plate and is anchored therein in mechanical and material locking relationship by the injection of the cement material.

With this inventive set-up, an anchor for lightweight construction panels is provided which can rapidly and safely be installed by hand or by a machine. The anchor is so designed that the fixing in the lightweight construction panel occurs in two steps. In a first step, the anchor being inserted is arrested in the lightweight construction panel purely mechanically so as to be locked in position. In a second step, it is cemented in place by means of a cement material which is injected from without and which cements the anchor at both ends and possibly also in the center area thereof in such a way that the upper and the lower cover plates are actually reinforced by way of the anchor.

The cement is injected into the central bore of the anchor via an injection needle which is inserted into the central bore so that the attachment area for the later attachment of the hardware is not filled or, respectively, contaminated by cement.

With the introduction of the cement, a certain cement distribution within the bore of the lightweight construction panel accommodating the anchor can be effected. Via the bore- and distribution passage system, the cement can be throttled and distributed upwardly and downwardly. The upwardly directed cement flow reaches the area of the upper cover plate, whereas the downwardly directed cement flow wets the lower cover plate.

Another possibility for distributing the cement is to divide the central bore of the anchor by an elastic separating wall or a rupturable membrane into a lower and an upper area. When the separating lip or the piercable membrane is opened by injection needle, cement can be supplied to the lower cover plate so that it can be cemented to the anchor. When sufficient cement has been injected, the injection needle is retracted, by a certain distance, into the central bore, whereupon cement is introduced via inclined or transverse bores to the upper cover plate for the attachment of the anchor to the upper cover plate.

As cement materials, one or two component cement or glues may be used. If expedient, the cements or cement mixtures may also be foamed.

The substance-locking attachment mentioned above is based on the principle of effective transmission of forces bending and rotational moments at at least one connection by material jointure of construction materials of the light-weight construction panel with the material of the anchor using an additional cement material.

The invention and particular features thereof will become more readily apparent from the following description of a particular embodiment thereof.

BRIEF DESCRIPTION OF THE DRAWINGS

FIG. 3 is a cross-sectional view of the anchor shown in FIGS. 1 and 2,

FIG. 4 is a top view of the anchor,

FIG. 5 shows the anchor, partially installed together with an installation tool, FIG. 6 shows the anchor as shown in FIG. 5 after complete insertion and the displacement of a wedging body, FIG. 7 shows the same as FIG. 6 after removal of the anchor installation tool and the injection of the cement, FIG. 12 is a perspective view of an anchor with a large wedging body and with longitudinal slots formed in the expansion body, and FIG. 13 shows an anchor as shown in FIG. 12 but cemented in position.

DESCRIPTION OF PARTICULAR EMBODIMENTS

Figure 2:
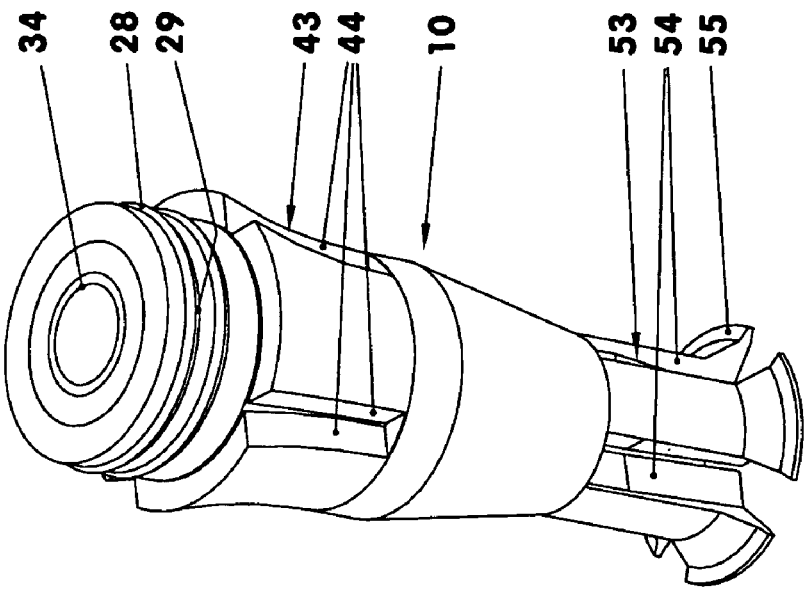
FIG. 2 is a perspective view, like FIG. 1, but as seen at an angle from above.
Figure 1:
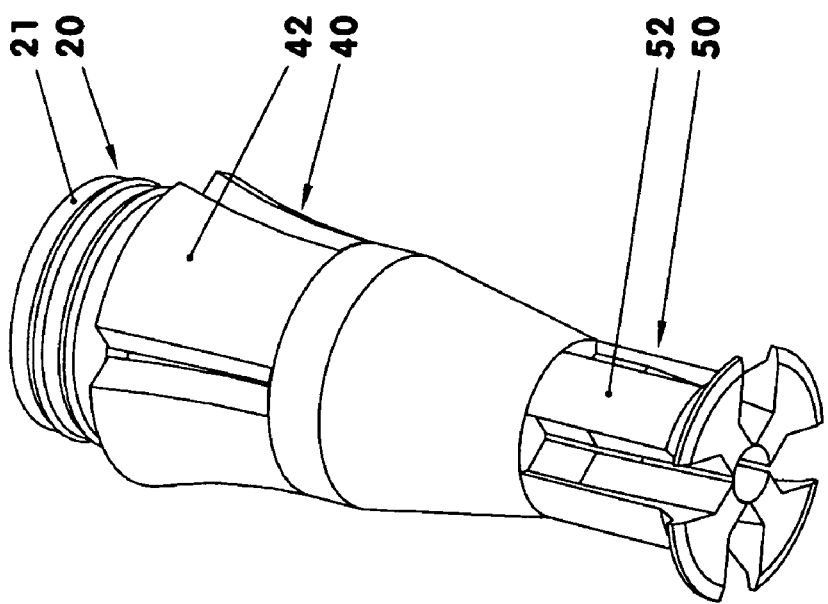
FIG. 1 is a perspective view of an anchor with an engagement section as seen at an angle from below.

The FIGS. 1 and 2 show an undeformed anchor. The anchor has an expansion body 10, which consists of three general sections 20, 40, 50. An upper section is a seating section 20 with a cylinder zone 21. The seating section 20 has a central threaded bore 34 for accommodating mounting elements such as screws. A central section is an engagement section 40, which in the shown embodiment includes for example four engagement elements 42. A lower section 50 is an expansion section, which also includes four clamping elements 52.

The anchor serves for example for mounting hardware to lightweight construction panels 100 without girders or solid inclusions, see FIG. 5. The lightweight construction panel 100 comprises two cover plates 101 and 111 and a support core 121 disposed therebetween. In the shown embodiment, each cover plate 101, 111 consists of a thin particle board. The support core 121 is for example a PV foam core. The cover plates 101, 111 have inner surfaces 103, 113 via which the cover plates are cemented to the support core 12). The lightweight construction panel has for example a wall thickness of 20 to 40 millimeters. Each cover plate is 2 to 8 mm thick. Instead of a foam core among others also a honeycomb core may be provided. The lightweight construction panel includes a bore 130 which comprises sections 105, 125 and bore section 115. The latter is a dead-end bore. Its depth is here 25-75% of the material thickness of the lower cover plate 111. Expediently instead of a dead-end bore 115, a through-bore may be provided. For a type of anchor as shown in FIGS. 1 and 2, a dead-end bore 115 may have a smaller diameter than the bores 105 and 125.

The lightweight construction panel 100 may also be curved, for example, cylindrically or spherically if the material thickness of the support core 121 is at least approximately constant.

In order to facilitate installation of the anchor, first, a bore is drilled through the first plate 101 and the support body 121. A bore of a certain depth is drilled into the second cover plate 111, that is, the bore does not extend fully through the second cover plate 111. As drilling tool for example, a spiral drill is used, which has a tip angle of 180°. Expediently, also a spot facer may be used. Depending on the type of anchor, the bore 130 may also be drilled by a step facer, for example, in the dead end bore 115 of the lower cover plate 111 should have a smaller diameter than the rest of the bore 105, 125. The cavity or bore 130 formed is cleaned out for example by compressed air.

FIG. 3 shows an undeformed anchor in an axial cross-section. The expansion body 10 extends through all three sections 20, 40, 50. In the section 20 and in the upper half of the engagement section 40, an at least approximately cylindrical tubular section 31 is disposed. The tubular section 31 has a central cylindrical threaded bore 34 for the later accommodation of a screw.

Around the tubular section 31, for example, four engagements elements 42 are arranged. The elastic engagement elements 42 are—when viewed in section according to FIG. 3—sickle-shaped and project funnel-like outwardly. Their maximum diameter is for example 2 to 3 mm greater than the inner diameter of the bore 105. Between the individual engagement elements 42 upwardly widening longitudinal slots are formed. The side walls of the engagement elements 42, that is the walls forming the longitudinal slots 43, are disposed in planes in which also the centerline 9 of the anchor extends.

The individual engagement elements 42 end on top below the lower surface of the cylinder zone 21 and form a planar front face, see FIG. 3. The latter is spaced from the front face of the cylindrical zone 21 only by a few tenth of a millimeter.

The engagement elements 42 may also be arranged for example on a ring which is disposed on the expansion body 10 and connected thereto in a form- or force-locking manner—see DE 10 2007 031 183.

The engagement elements 42 according to FIGS. 1 and 2 have side surfaces 44 which extend parallel to each other. In this way, the width of the longitudinal slots is smallest at the inside of the engagement elements 42. It is also possible to provide for example in the upper area of the engagement elements 42 some radial bores to permit the later passage of cement out of the cavity 49.

The tubular section 31, the engagement elements 42 and the front surface of the cylinder zone 21 form an open cavity 49.

Below the tubular section 31, there is a conical section 38 of the expansion body 10, which extends from the engagement elements 42 up to the lower spreading sections 50. The outside diameter of the conical section 38 becomes narrower from top to bottom by about 30%—see FIG. 3. It is always smaller than the inner diameter of the bore 105.

The bore 31 which is threaded in the tubular section 31 extends into the conical section 38 for example as a smooth bore 35. The diameter of the bore 35 is the same as, or is smaller than, the core diameter of the threaded bore 34. The bore 35 is cylindrical in the center part of the anchor but is truncated cone-shaped in the lower anchor part. The cylindrical bore section 36 is in communication with the cavity 49 via several, for example four, inclined bore 48. The inclined bores 48 end below the center section 3 of the anchor in the bore 35, see FIG. 7.

In the spreading section 50, the truncated cone-shaped area 37 of the bore 35 is provided with for example four axial slots 53 for forming four clamping elements 52, see FIG. 2. The axial slots 53 have in the undeformed state of the clamping elements a constant minimal gap width. They are disposed here in each case in the extension of the longitudinal slots 43. The side walls of the clamping elements 52 may be oriented similarly to the side walls of the engagement elements 42, at least over a certain area.

The axial slots 53 have a circumferential spacing of 90° like the longitudinal slots 43. They may also be of spiral, zig-zig, meander or scallop-shape. For reducing stress concentrations, the axial slots 53 may also be rounded at their ends.

The lower end of the bore 35 has, in accordance with FIG. 3, an inner diameter which is greater than half the inside diameter of the cylindrical bore section 36 of the bore 35.

At the end of the spreading section 50, there is at the outside a radially projecting web 55. The circumferentially extending web 55 is in each case interrupted by the axial slots 53. The web 55 has for example a radial height of about 0.3 to 1 mm. The maximum diameter of the web 55 is in connection with radially undeformed clamping elements 52 smaller than the inside diameter of the bore 115, see FIG. 5.

Alternatively, instead of a web 55, a single or multiple thread, a circumferential corrugation or a knub structure may be provided.

When the anchor is installed the cylinder zone 21 ends at the top for example flush with the tubular section 31. Between the front face 23 and the upper edge of the engagement elements 42, a circumferential groove 33 is formed into the outer wall of the tubular section 31. In this groove 33, an accurately fitting circumferential web 24 of the cylinder zone 21 is accommodated for the axial fixing of the cylinder zone 21 to the tubular section 31.

The radially outer contour of the cylinder zone 21 includes several, for example four, longitudinal locking webs 25, see FIG. 4, which extend for example parallel to the center line of the anchor 9. The individual longitudinal locking webs 25 form, together with, in each case, an adjacent channel 27, a rotation-preventing structure of the anchor and also an injection vent. The longitudinal locking web 25 has a locking flank 26, which is also a flank of the longitudinal passage 27. The locking flank 26 shown herein is planar and has a surface normal which extends vertically with respect to the center line of the 9 of the anchor and, at the same time, is a tangent to a circle of the outer contour of the cylinder zone 21. The respective surface normal points in clockwise direction so that the longitudinal locking web 25 prevents rotation of the anchor upon threading-in an attachment means.

The longitudinal locking webs 25 extend for example 0.1 to 0.3 millimeter above the cylindrical outer contour of the cylinder zone 21. In the shown embodiment, the longitudinal passage 27 extends 0.15 to 0.35 millimeter into the cylindrical outer contour.

A longitudinal passage 27 may be arranged at both sides of a longitudinal locking web 26, which is symmetrical in cross-section. In this way, rotation of the anchor in either direction is prevented. The longitudinal passages 27 may also be arranged independently of the longitudinal locking webs. They also do not need to extend in a straight line.

Alternatively, as shown in FIGS. 1 and 2, the cylinder zone 21 may have for example two circumferential barbed webs 28. The closed annular barbed webs 28 have individual cross-sections of triangular shape. They project from the cylindrical outer contour by, for example 0.15 millimeter. Above each barbed web 28, there is an annular channel 29 which also has a triangular cross-section.

The barbed webs 28, see FIG. 12, cause a rotation-preventing engagement of the expansion body 10 in the bore section 105. They additionally seal the mounting gap between the expansion body 10 and the lightweight construction panel 100 so that neither dirt nor moisture can enter. In this way, no support core material and no cement can reach the ambient or the outer surface 102 of the panel. This variant is particularly suitable for injection cemented anchors which require only small amounts of cement.

FIG. 3 shows an anchor which includes a wedge body 60, see FIGS. 5-7. The wedge body 60 is an essentially cylindrical component which, in an uninstalled anchor, is disposed in the cylindrical area 36 of the bore 35. At the cylindrical outer surface retaining nubs or similar means may be arranged which project into corresponding support cavities of the bore 35: In this way, the wedge body 60 can be fixed in certain positions.

The wedge body 60 has at its side facing the seating section 20, a wedge body sleeve 61. By this tubular sleeve 61, the length of the wedge body 60 is increased to such an extent that the wedge body 60 closes in its lower end position the axial slots 53 at least upwardly, see FIGS. 6 and 7.

For example, in the center of the wedge body, there is a passage 63 which provides for communication between the end faces of the wedge body 60. The wedge body passage 63 has a minimum circular cross-section which corresponds to the minimum cross-section of an inclined bore 48.

In the exemplary embodiments, the wedge body 60 is, as far as its outer contour is concerned, at least to a large extent a rotation-symmetrical body. Alternatively, its various cross-sections, or at least parts thereof, may have square, polygonal, oval or otherwise profiled cross-sections. The wedge body 60 may also be connected to the expansion body 10 for example via a thread so that the wedge body 60 is installed not by a linear non-rotating engagement motion but by way of threading.

The expansion body 10 and the wedge body 60 consist of a plastic material for example of a polyamide.

FIG. 5 shows an anchor during installation into the bore 130 of a lightweight construction panel 100 using an anchor installation tool 80. The engagement elements 42 are shown in the process of passing through the upper cover plate 101, while being compressed.

The anchor installation tool 80 comprises in this case at least an engagement tube 81, a spreading plunger 90 and a down holder 95.

The engagement tube 81 is for example a tubular component which has a through bore 82 and is provided at its front end with a threaded section 83. For the installation of the anchor, the threaded section 83 is threaded into the threaded bore 34 of the anchor. In connection with anchors whose central bore is not threaded, the engagement tube engages the anchor in the central bore for example by means of force-locking engagement elements.

Alternatively, the bore 34 may have a rectangular, polygonal, oval or star-like cross-section for accommodating various types of screws, for example, particle board screws or wood-screws. The opening cross-section may become smaller toward the end of the bore in a continuous or discontinuous manner. This also applies to smooth-walled bores with cylindrical or conical wall surfaces. Appropriate engagement elements are provided for all of these forms.

In the bore of the engagement tube 81, a spreading plunger 90 is axially movably supported. The engagement tube 81 itself is axially movably supported in the down holder 95.

The engagement tube 81 has a shoulder 84 via which it abuts the upper front surface 23 of the anchor. The down holder 95 is disposed on the surface 102 of the lightweight construction panel 100.

FIG. 6 shows the expansion body 10 after a first and a second installation movement into the bore 130. During the first installation movement, the expansion body 10 is inserted into the bore so far that it comes into contact with the bottom 110 of the dead end bore 115 or is very close to it. In this way, it is ensured that the engagement elements which, during insertion into the bore section 105, are compressed radially toward the tubular section 31, are, after passing the lower surface 103 of the upper cover plate 101, free to spread apart below the upper cover plate 101 away from the tubular section 31.

When the engagement elements 42 are spread apart, the expansion body 10 is, in a second installation movement, retracted by the engagement tube 81 opposite its installation direction 8 in order to move the upper end surfaces or edges of the engagement elements 42 into abutment with the lower surface 103 of the upper cover plate 101. Upon retraction of the anchor, the anchor installation tool 80 is again seated on the outer surface 102 by way of the down holder 95, see FIG. 6. The front surface 23 of the expansion body 10 is now disposed just below the outer surface 102.

In a further installation step, then the clamping elements 52 of the expansion body 10 are engaged in the dead end bore 115, see FIG. 6. To this end, the spreading plunger 90 is moved against the wedge body 60 so as to displace it in installation direction downwardly into the bore 35 while the anchor installation tool 80 that is, the down holder 95 and the engagement tube 81 remain stationary. As soon as the wedge body 60 enters the conical area 37 of the bore 35 which becomes narrower toward its bottom, the clamping elements 52 spread apart radially. The individual sections of the webs 55 dig into the wall of the dead end bore 115. The engagement procedure is completed only when the wedge body 60 has almost reached the lower end of the expansion body 10, see FIG. 6. The bore 35 is now, at least essentially, cylindrical. The axial slots 53 are now maximally spread and, at the same time, completely covered by the wedge body 60 at least toward the top. The anchor is now firmly fixed in the lightweight construction panel 100.

Subsequently, the spreading plunger 80 is retracted, the engagement tube is unscrewed from the threaded bore 34 and the anchor installation tool 80 is pivoted away from the lightweight construction panel 100.

As shown in FIG. 7, now an injection needle 140 is inserted into the bore 35. The injection needle 140 consists among others of a needle tube 141 provided at its front with a reduced diameter needle tip area 145 by way of a constriction 143. The needle tube 141 and the needle tip area 145 have a needle bore 142, which narrows down in the area of the needle tip 147 to form a needle tip opening 148. In the rear part of the needle tip area 145, there are for example four transverse bores 146. The transverse bores 146 and the needle tip opening have all the same cross-section.

The injection needle 140 in FIG. 7 is shown inserted into the bore 35 so for that the needle constriction 143 is disposed below the axial center area 3 of the anchor just in front of the inclined bores 48. The front section of the needle tip area 145 is now disposed in the wedge body sleeve 61 of the wedge body 60 with little play. At this point, the needle tip opening 148 is disposed adjacent the wedge body passage 63. The centerlines of the transverse bores 146 are disposed in a plane which is at least near a plane which is defined by the center points of the openings of the inclined bores 48. Between the needle constriction 143 and the upper front end of the wedge body 61, an annular channel 32 is formed via which the transverse bores 146 are in communication with the inclined bores 48.

Now cement 5 is introduced via the needle bore 142. In accordance with cross-section ratios of the needle tip opening 148 and the transverse bores 146 partial cement amounts are pressed via the bottom 56 and the axial slots 53 into the area of the lower cover plate 111, wherein four partial amounts flow via the annular passage 32 and the inclined bores 48 to the cavity 49 and from there via the longitudinal slots 43 to the area above the upper cover plate 101. The distribution of the cement flow between the top and the bottom is determined by the number of transverse bores 146.

At the bottom, the cement connects the spreading section 50 to the lower cover plate 111 and to the lower part of the support core 121. On top, the engagement elements 42, the tubular sections 31, the cylinder zone 21 and the upper cover plate 101 are cemented together. At least in some areas, the upper anchor area is also cemented to the support core 121.

The air displaced during the injection of the cement is vented to the ambient via the longitudinal passages 27 of the cylinder zone 21.

During the retraction of the injection needle 140 from the bore 35, it is possible to discharge a small amount of cement shortly over the first few millimeters of needle travel in order to prevent a vacuum-induced sucking of the wedge body 60 out of its wedge position.

The cement used is a single component cement, for example, a reactive melt glue on polyurethane basis. At 100° to 120° Celsius, it has a density of 3000 to 60000 mPa s. However, also a moisture cross-linking glue made on polyurethane basis which at room temperature has a density of 4000 to 8000 mPa s, may be used. Both cements cure without an increase in volume.

Because of the high density of the cements, no cement flows during the injection of the cement between the outer wall of the injection needle 140 and the inner wall of the bore 35 toward the threaded bore 34. The gap remaining between the two walls is 0.1 to 0.2 millimeters.

Alternatively, the bore 35 may be provided with a collar which is sealingly engaged by a collar formed on the injection needle 140. Also, a special seal may be disposed on the collar.

In FIGS. 7 and 13, the cement-indicating markings are partially eliminated in the areas where the cement carrying bores and channels are joined.

In FIGS. 8 to 11, an anchor is shown which comprises an expansion body 10, which ends ahead of the inner side 113 of the lower cover plate 111. The distance between the lower front end of the expansion body 10 and the surface 113 is for example 0.1 to 0.3 millimeter.

Figure 8:
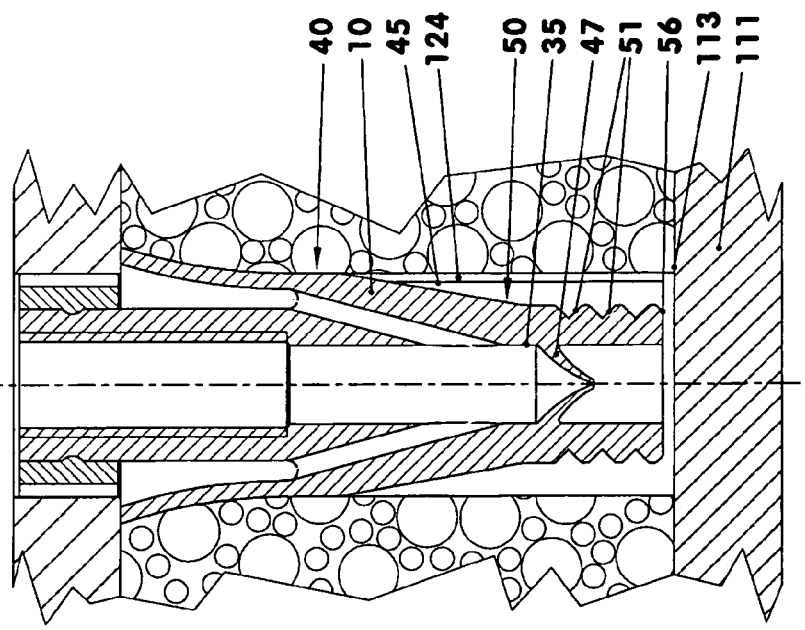
FIG. 8 is a cross-sectional view of an installed anchor with a dividing lip or membrane.
Figure 11:
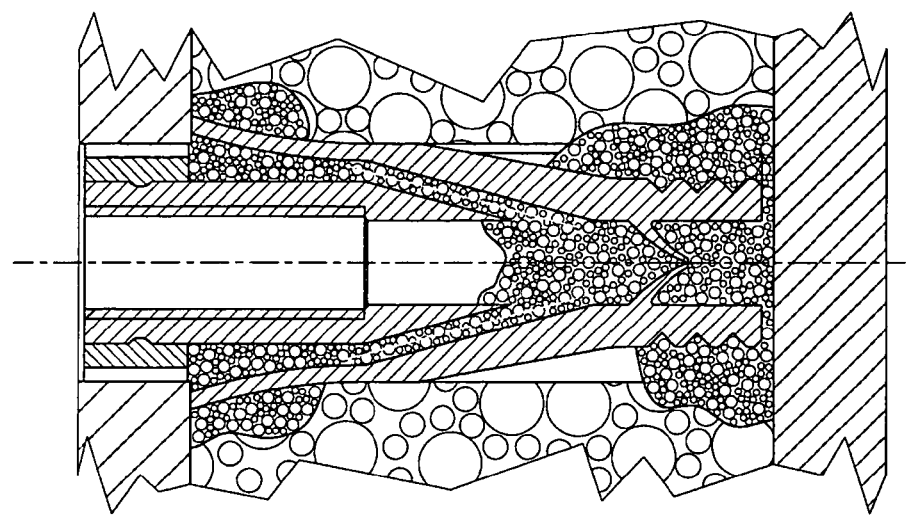
FIG. 11 shows the anchor of FIG. 5, with the bottom end filled with cement.
Figure 10:
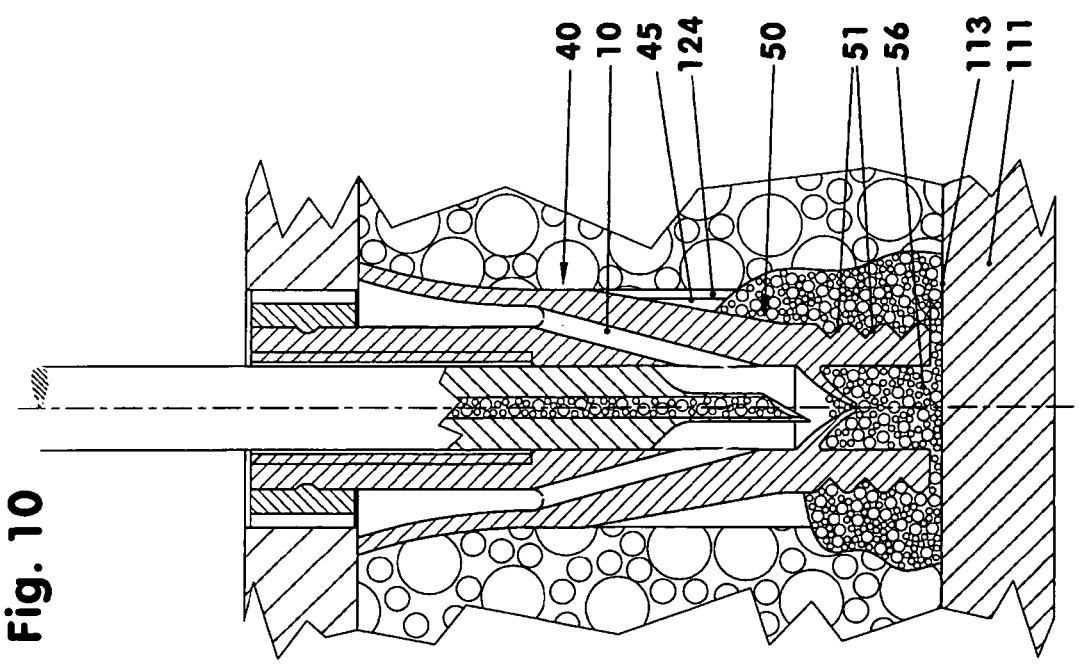
FIG. 10 shows the same as FIG. 9 with partially retracted injection needle.

In the shown example, the expansion body 10 includes a cylindrical bore 35 in which for example an elastic separating lip or membrane 47 is arranged. The funnel-shaped, downwardly arched separating lip 47 which is open in its center is arranged halfway between the openings of the inclined bores 48 into bore 35 and the bottom 56 as shown in FIG. 8. The separating lip may have radial cuts extending from the central opening.

Below the separation lip 47, the bore 35 is in communication with the area surrounding the anchor via the axial slots 53. The axial slots 53 have the form as shown in FIGS. 1 and 2. The bottom 56 may be for example concavely curved.

In the lower area, the spreading section 50 is provided for example with several circumferential annular grooves 51. They may have for example triangular or otherwise shaped cross-sections. Instead of the annular grooves, the spreading section 50 may also be threaded on its outside.

The expansion body 10 has, in the areas between the axial slots 53, additional, for example radially oriented, guide ribs 45 whose maximum radial extension may reach the diameter of the cylinder zone 21. The surface of the ribs 45 and/or the outer surface of the bottom 56 may be structured to improve the cement adhesion. The ribs 45 extend up to the engagement section 40.

Figure 9:
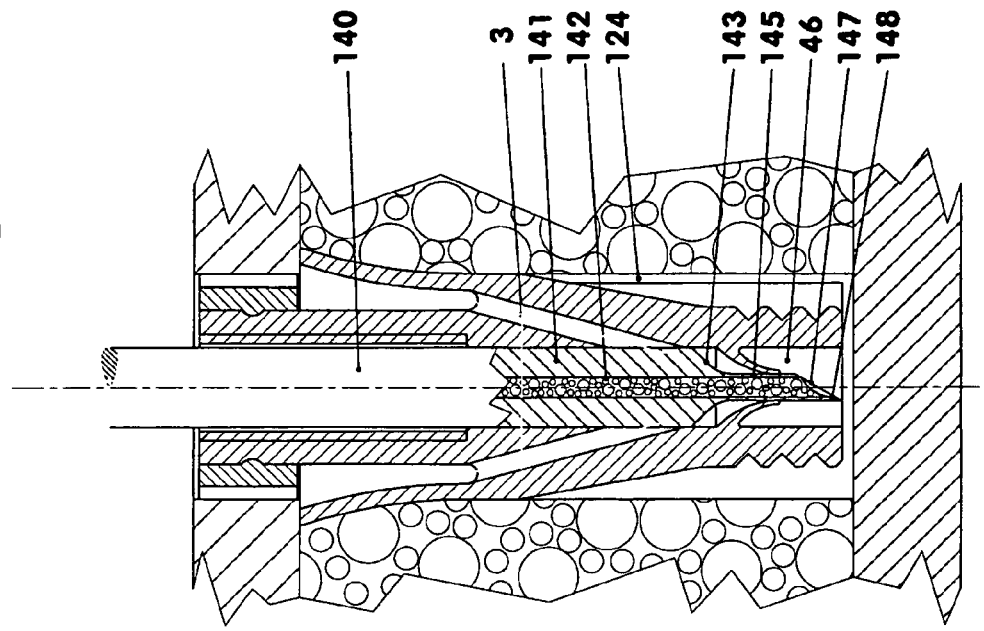
FIG. 9 shows the same as FIG. 8 but with the injection needle inserted.

As shown in FIG. 9, an injection needle 40 is inserted into the bore 35. The needle tube 141 of the injection needle 140 narrows down toward a needle tip areas 145 via a needle constriction 143. The outer diameter of the needle tube 141 is reduced at the constriction 143 for example to two thirds of the upper injection needle diameter. The central needle bore 142 retains its inner diameter over the full shown length of the injection needle. The front needle tip 147 has a 45° cone. When the injection needle 140 is inserted, it opens with its tip elastically the separating lip 47 so that the needle tip with its opening projects into the lower cavity 46 of the bore 35.

Then, by the way of the lower cavity 46, the lower part of the anchor and the bore 130 is at least partially filled with cement. For example a constant amount of cement is ejected, see FIG. 10. Subsequently, the injection needle 140 is retracted so far that it is positioned behind the separation lip which closes again. At this point, a second amount of cement is injected into the bore 35 above the separation lip 47 via the injection needle opening 148. In the annular passage 32, the cement is distributed so as to flow via the inclined bores 48 to the cavity 49 and from there to the upper cover plate 101, see FIG. 11. Subsequently, the injection needle 140 is retracted fully in a known manner.

Alternatively, the spreading section 50 may also in this embodiment have the same configuration as shown in FIGS. 1 and 2. The expansion body 10 then would expand or spread apart in the support core 121 and be engaged therein. The cement would flow into the cavity 124 as described above in connection with FIG. 11.

In FIGS. 12 and 13, an anchor is shown which comprises an expansion body 10 and a wedge body 60, wherein the wedge body 60, which is at least partly inserted into the expansion body 10, includes a threaded bore 34 into which a fastening means can be threaded. The installed anchor is disposed in a bore 130 of the construction 100 and extends at least partially through the cover plates 101, 111 and the support core 121. The expansion body 10 has engagement elements 42 and clamping elements 52. The wedge body 60 includes a cylinder zone 21 and two wedging zones 80, 95. With the anchor installed, a cylinder zone 21 is disposed in the bore section 105 of the first cover plate 101 and the wedge zones 80, 95 spread the engagement 42 and the clamping elements 52 of the expansion body 10 apart within the intermediate support core layer 121 and in the dead end bore 115 of the second cover plate 11. In this way, a locking structure 65 of the wedge body 60 locks the expansion body 10 with a locking structure 15 of the expansion body 10, see DE 10 2006 049 952.

As shown in FIG. 13, an injection needle 140 is inserted into the wedge body 60 so that the opening 148 of the needle tip 147 is disposed below the axial center cross-sectional plane 3.

The needle tip is disposed just ahead of at least one transverse bore 64, in the present case four such bores, which lead to an annular channel 16. The annular channel 16 is directly in communication with the cavity 124 via the axial slots 22 of the spreading body. The cavity 124 is part of the corrugated web intermediate support core 122. Via the injection needle 140, the cement is pressed through the transverse bores 64, the annular channel 16 and the axial slots 22 into the cavity 124. The whole cavity 124 may be filled. It is possible to monitor the cement pressure during all cement injections. The cement supply is only interrupted when the cement pressure increases measurably by the complete filling of the cavities surrounding the anchor.

Of course, the concept of introducing cement material via the anchor is not only limited to anchors with at least partially cylindrical outer contours. The anchor may also be designed for bores or passages which have at least sections of oblong or oval cross-sections.

REFERENCE NUMERALS

| | |
|---|---|
| 3 | Center section of anchor |
| 5 | Cement |
| 8 | Anchor installation tool |
| 9 | Centerline of anchor |
| 10 | Expansion body |
| 15 | Locking position |
| 16 | Annular channel |
| 20 | Seating section |
| 21 | Cylinder zone |
| 22 | Axial slots |
| 23 | Front surface |
| 24 | Circumferential web |
| 25 | Longitudinal locking webs |
| 26 | Locking web |
| 27 | Longitudinal passage |
| 28 | Barbed webs |
| 29 | Annular channel |
| 31 | Tubular section |
| 32 | Annular passage |
| 33 | Groove |
| 34 | Threaded bore |
| 35 | Bore |
| 36 | Cylinder bore section |
| 37 | Truncated cone-shaped area |
| 38 | Conical section |
| 39 | Inclined bores |
| 40 | Engagement section |
| 42 | Engagement elements |
| 43 | Longitudinal slots |
| 44 | Side surfaces |
| 45 | Guide ribs |
| 46 | Lower cavity |
| 47 | Separation lip |
| 48 | Inclined bore |
| 49 | Cavity |
| 50 | Lower section = spreading section |
| 51 | Annular grooves |
| 52 | Clamping elements |
| 53 | Axial slots |
| 54 | Side surfaces of clamping elements |
| 55 | Web |
| 56 | Bottom |
| 59 | Cavity |
| 60 | Wedge body |
| 61 | Wedge body sleeve |
| 63 | Wedge body passage |
| 64 | Transverse bore |
| 65 | Locking structure |
| 80 | Anchor installation tool |
| 81 | Engagement tube |
| 82 | Through-bore |
| 83 | Threaded section |
| 84 | shoulder |
| 90 | Spreading plunger |
| 95 | Down holder |
| 100 | Lightweight construction panel |
| 101 | Upper cover plate |
| 102 | Outer surface |
| 103 | Inner surface |
| 104 | Cavity |
| 105 | Bore section |
| 111 | Lower cover plate |
| 113 | Inner surface |
| 114 | Cavity |
| 115 | Dead end bore |
| 119 | Bottom of bore |
| 121 | Support core |
| 122 | Corrugated web support core |
| 124 | Cavity |
| 125 | Bore section |
| 130 | Bore |

-continued

| | |
|---|---|
| 140 | Injection needle |
| 141 | Needle tube |
| 142 | Needle bore |
| 143 | Constriction |
| 145 | Needle tip area |
| 146 | Transverse bores |
| 147 | Needle tip |
| 148 | Needle tip opening |

What is claimed is:

1. An anchor for a form- and material-locking installation in construction panels (100) comprising spaced first and second cover plates (101, 111) with a support core layer (121) disposed between the cover plates (101, 111), said anchor including at least an expansion body (10) which, with the anchor being installed in a bore (130) of the construction panel (100) extends through the first cover plate (101) and the intermediate support core layer (121) and ends in the second cover plate (111), the expansion body (10) having engagement elements (42) which spread outwardly so as to abut the inner surface of the first cover plate (101) and including an axial anchor bore (35) which is in communication via transverse and inclined passages (48) and channels (49) with at least one cavity (104, 114, 124) disposed between the expansion body (10) and the walls surrounding the expansion body (10) and forming the construction panel bore (130), the anchor further having, at its top end disposed in the space surrounded by the engagement elements (42), a tubular section (31) for accommodating a mounting means, the tubular section (31) and the engagement elements (42) forming therebetween the channels (49), and at its lower end, a lower spreading section (50) with clamping elements (52) and wedge body (60) for insertion into the lower spreading section (50) for bending the clamping (52) into engagement with the second cover plate (111).

2. The anchor according to claim 1, wherein the inclined and transverse bores (48) and the channels (49) are arranged in the axial center area of the anchor.

3. The anchor according to claim 1, wherein the expansion body (10) includes a cylinder zone (21) provided with longitudinal passages for venting the cavities in and around the anchor.

4. The anchor according to claim 1, wherein the lower spreading section (50) is provided with longitudinally extending slots (53) so as to form outwardly bendable clamping elements (52).

5. The anchor according to claim 4, wherein the wedge body (60) has an axial length exceeding the length of the slots (53) formed between the clamping elements (52).

6. The anchor according to claim 1, wherein the bore (130) has a bore section (105) extending through the top cover plate (101) and the expansion body (10) has a cylindrical section (21) which, when the anchor is installed in the bore (130), is disposed in the bore section (105), said cylindrical section (21) of the expansion body (10) having a surface structure (25) providing for engagement with the bore (105) for preventing rotation of the anchor upon its insertion.

7. A method for the installation of an anchor into lightweight construction panel including a first cover plate (101) and a second cover plate (111) with a support core layer (121) disposed therebetween, said anchor including an expansion body (10) provided with engagement means for retaining the anchor in a panel bore (130) formed into the light-weight construction panel so as to extend at least through the first cover plate (101) and the intermediate support core layer (121), and the expansion body (10) including at least two engagement elements (42) which, upon insertion of the anchor into the panel bore (130), are spread apart in the area of the support core layer (121) below the first cover plate (101) so as to prevent extraction of the anchor, the expansion body (10) further including an axial bore (35) and transverse and inclined distribution bores (48) and channels (49) leading to cavities (104, 114, 124) of the panel bore (130), said method comprising the steps of:

inserting an injection needle (140) fittingly into the axial bore (35), and injecting cement into the expansion body (10) for distribution in and around the anchor via the distribution bores and channels (48, 49).

8. The method as defined in claim 7, wherein after insertion of the expansion body (10) into the panel bore (130) and spreading out of the engagement elements (42) behind the first cover plate (101), the anchor is retracted by means of an anchor installation tool (80) so that the engagement elements (42) abut the first cover plate (101).

9. The method as defined in claim 7, wherein the injection needle (140) has, in the area in which it extend into the anchor, an outer diameter which is 0.1 to 0.2 millimeter smaller than the diameter of the axial bore (35).

10. The method as defined in claim 7, wherein the injection needle (140) has a tip (147) with a needle opening (148) and transverse bores (146) and wherein the injection needle (140) is inserted into the axial bore (35) of the anchor to such an extent that the needle tip opening (148) or all discharge openings (146, 148) of the injection needle (140) are disposed below a center cross-sectional plane (3) of the anchor.

* * * * *